United States Patent

Radig

[15] 3,667,505
[45] June 6, 1972

[54] ROTARY BALL VALVE FOR WELLS

[72] Inventor: Gary A. Radig, Lakewood, Calif.
[73] Assignee: Cook Testing Co., Long Beach, Calif.
[22] Filed: Jan. 27, 1971
[21] Appl. No.: 110,078

[52] U.S. Cl..........................137/630.14, 137/629, 251/63.4, 251/77, 251/174, 251/315
[51] Int. Cl..........................................F16k 11/16
[58] Field of Search....................137/601, 629, 630, 630.14, 137/630.15; 251/63.4, 77, 174, 315; 166/224, 226

[56] References Cited

UNITED STATES PATENTS

| | | | |
|---|---|---|---|
| 2,894,715 | 7/1959 | Bostock | 251/174 X |
| 2,974,922 | 3/1961 | Keithahn | 251/77 |
| 3,351,133 | 11/1967 | Clark, Jr. et al. | 166/226 X |
| 3,583,442 | 6/1971 | Dollison | 137/629 X |
| 3,509,913 | 5/1970 | Lewis | 166/224 X |

Primary Examiner—Robert G. Nilson
Attorney—Lyon & Lyon

[57] ABSTRACT

A subsurface safety valve for a well employs a rotary ball valve assembly which includes a ball member interposed between annular seats positioned within the housing. The upper seat is mounted on a carrier having flange portions engaging under a shoulder within the housing. A lower seat is spring-loaded against the spherical surface of the ball member. Integral offset aligned pins on the ball member are engaged by arms on an actuator mounted for axial movement within the housing, the arms straddling the ball member and having laterally opening slots which engage the pins. The ball member and the flange portion of the carrier have laterally spaced parallel vertical surfaces which are received between similar surfaces on the actuator arms. A bypass valve is provided between the actuator and the housing so that fluid may pass through housing ports and actuator ports to equalize pressure across the ball member during the first part of movement of the actuator, the subsequent part of the movement serving to move the ball member between open and closed positions. A spring moves the actuator axially in one direction and a hydraulic cylinder assembly acts to move it in the other direction. Pressure in the hydraulic cylinder is obtained from a control line extending to the surface.

9 Claims, 8 Drawing Figures

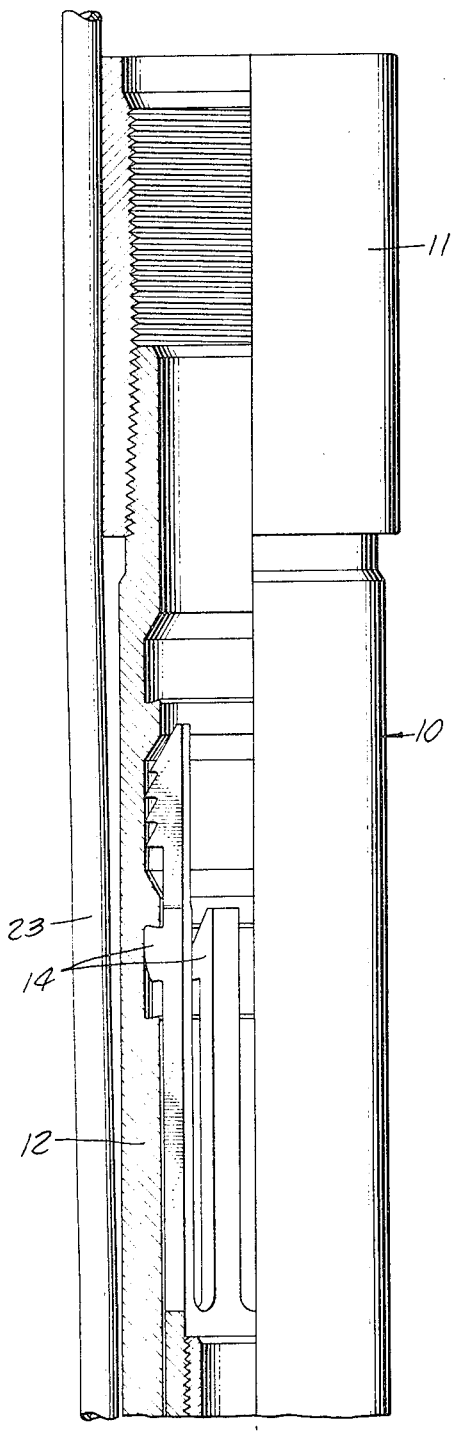
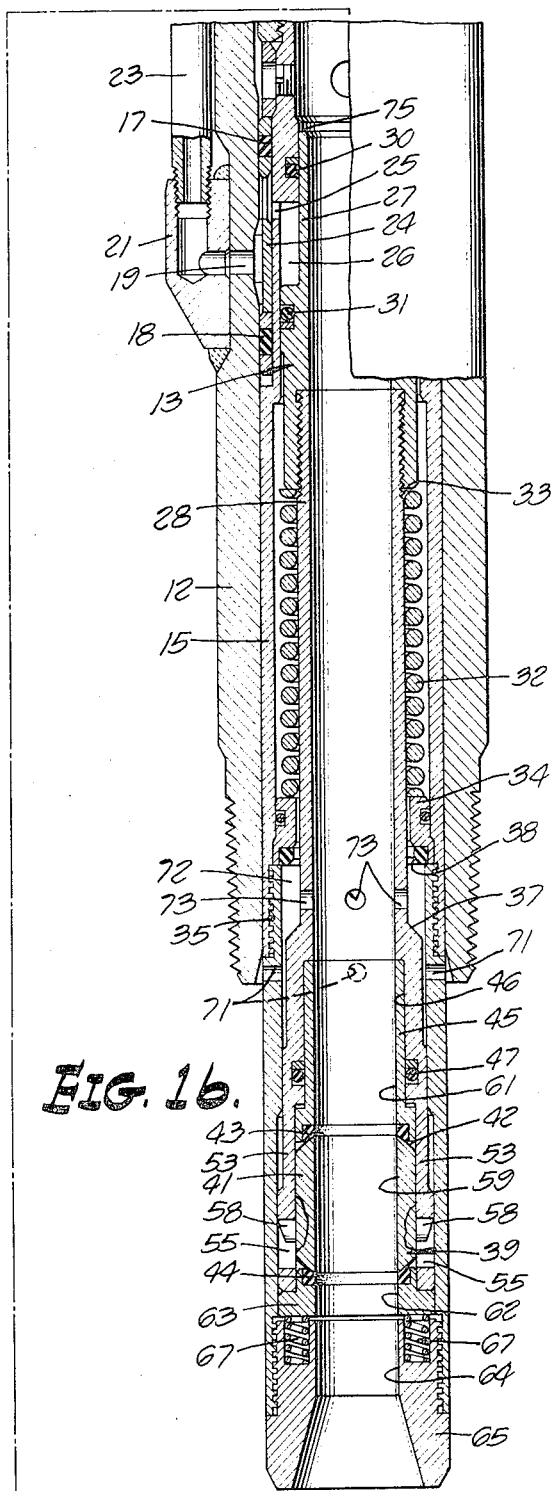
FIG. 1a.
FIG. 1b.
INVENTOR
GARY A. RADIG
BY Lyon & Lyon
ATTORNEYS

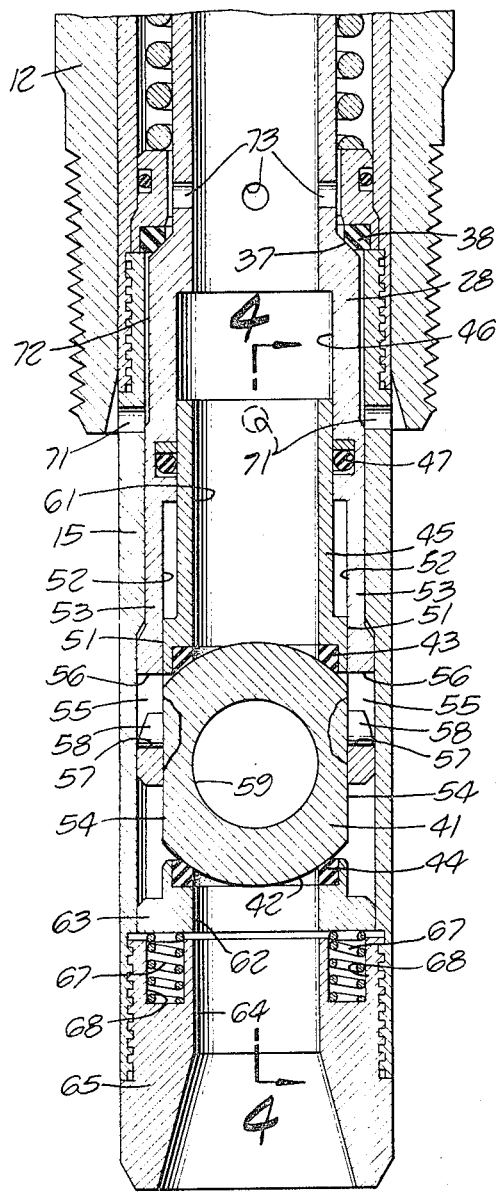
FIG. 2.
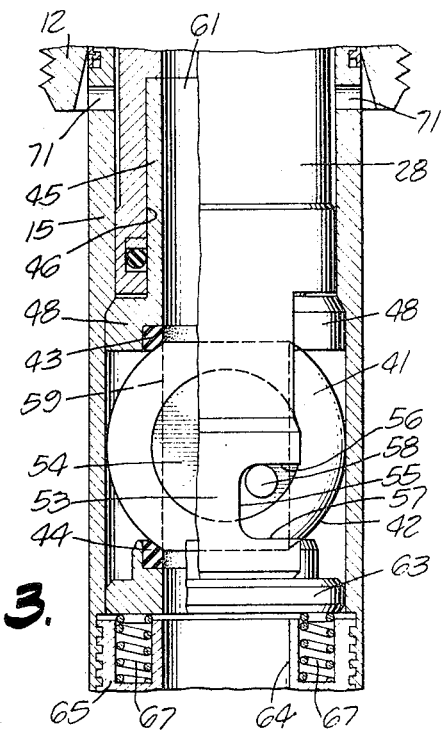
FIG. 3.
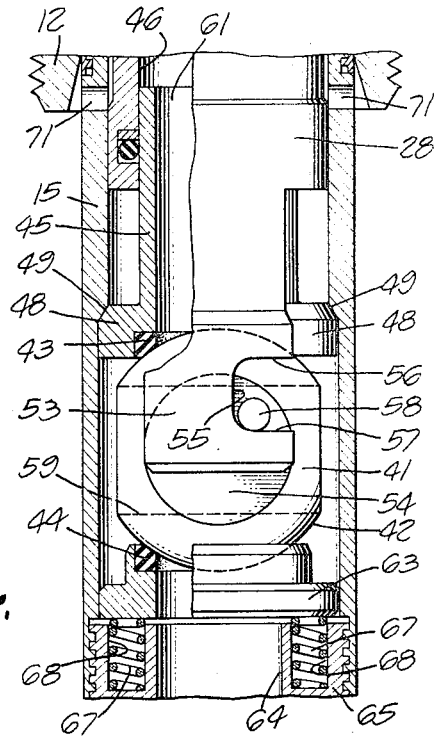
FIG. 4.
INVENTOR
GARY A. RADIG
BY
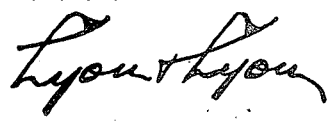
ATTORNEYS INVENTOR
GARY A. RADIG
BY Lyon & Lyon
ATTORNEYS

ROTARY BALL VALVE FOR WELLS

This invention relates to subsurface safety valves of the type employed in oil and gas wells. A pressure line extending from the surface operates a hydraulic cylinder assembly to cause a valve in the eduction tube to remain open. A spring adjacent the valve opposes the action of the hydraulic cylinder assembly, so that release of pressure in the control line permits the spring to close the valve, and thereby shut in the well.

This invention is particularly directed to an improved form of rotary ball valve assembly for use in wells. The assembly is constructed to be run into the eduction tube on a wire line and to be latched in place. When the ball valve is in open position, a large diameter opening extends through the assembly with minimum restriction at the valve. The rotary ball member and its axially movable actuator are of novel construction, the ball having integral offset aligned pins engaged by slots in bifurcated arms on the actuator, the arms straddling the ball and straddling a portion of the member carrying the upper seat. The lower seat is spring-mounted against the ball surface. A bypass valve and suitable ports are provided for equalizing the pressure across the ball member while moving it between open and closed positions. Other and more detailed objects and advantages will appear hereinafter.

In the drawings:

FIG. 1a and FIG. 1b show a sectional side elevation of a preferred embodiment of this invention. FIG. 1b is a continuation of the lower end of FIG. 1a.

FIG. 2 is a sectional elevation showing the parts at the lower end of FIG. 1b, but with the ball valve moved to closed position.

FIG. 3 is a sectional elevation similar to FIG. 4 but showing the valve in open position.

FIG. 4 is a sectional elevation taken substantially on the lines 4—4 as shown in FIG. 2.

Figure 5:
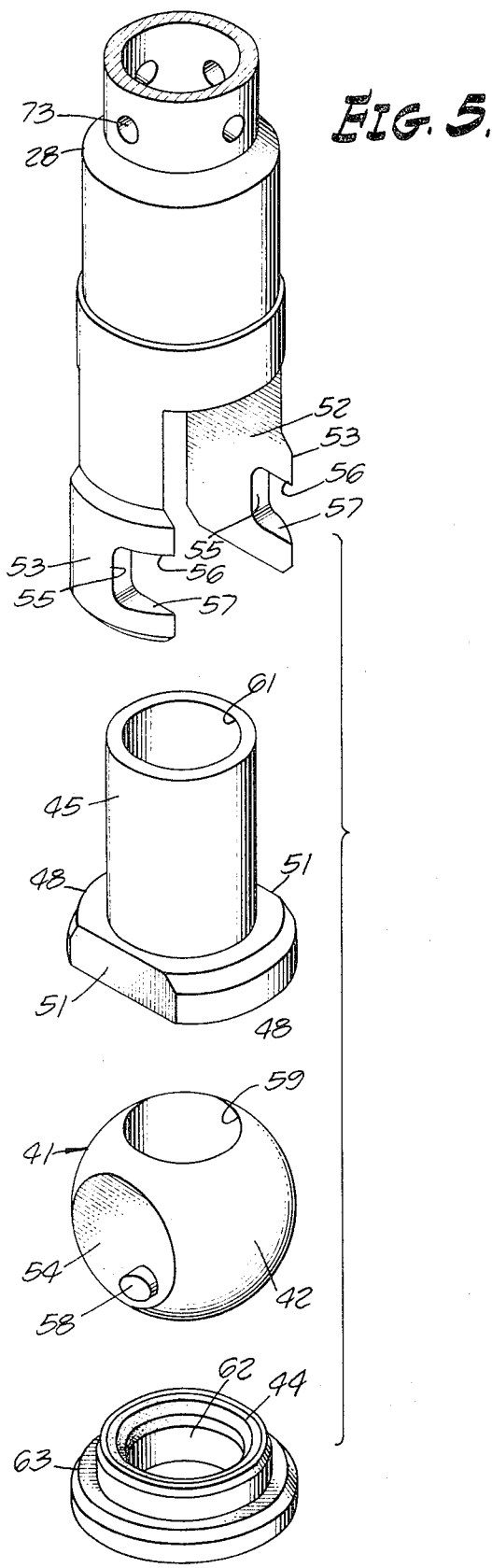
FIG. 5 is an exploded view showing the construction and manner of assembly of the actuator, upper seat carrier, ball valve member, and lower seat.

Referring to the drawings, a well conduit generally designated 10 extends into a well from the surface and comprises tubular sections connected end-to-end by threaded couplings 11. One of these tubular sections comprises a landing member 12 constructed to receive a valve assembly generally designated 13, which is lowered through the well conduit 10 and latched into position within the member 12 by means of spring fingers 14. The insertable valve member 13 includes a housing 15 made up of a number of tubular parts connected end-to-end, and having the resilient latch fingers 14 provided on the upper end.

Axially spaced seal rings 17 and 18 on the housing 15 engage the inner surface of the landing member 12 above and below the side port 19. This port communicates by way of terminal part 21 and control line 23 with a source of hydraulic pressure, not shown, at the surface. A ported spacer 24 separates the seals 17 and 18, and the housing has ports 25 which communicate through the ported spacer and through ports 19 with the pressure in the control line 23.

An annular expansible chamber 26 in communication with port 25 is formed within the housing 15 around the tubular extension 27 which is connected to and forms a part of the actuator 28. Seal rings 30 and 31 prevent leakage from the chamber 26. A coil spring 32 encircles a portion of the actuator 28 within the housing 15. The upper end of the spring 32 engages the shoulder 33 on the actuator, and the lower end rests on a sealing ring 34 clamped within the housing by the threads 35. From the foregoing description it will be understood that hydraulic pressure in the chamber 26 communicated from the control line 23 acts to hold the actuator 28 downward against the action of the coil spring 32. When the hydraulic pressure is reduced, the spring 32 lifts the actuator to bring the external tapered shoulder 37 on the actuator into sealing contact with the seat 38 carried on the housing 15.

The rotary ball valve generally designated as 39, as shown at the lower end of FIG. 1b, includes a ball member 41 having a spherical surface 42 contacting the upper and lower annular seats 43 and 44. The upper seat 43 is mounted in the lower end of a carrier 45, and the upper portion of this carrier is tubular and is slidably received within the bore 46 in the actuator 28. A seal ring 47 prevents leakage. The lower portion of the carrier 45 includes oppositely extending flange portions 48 which engage the downward facing shoulder 49 on the housing 15. The flange portions 48 are separated by parallel vertical surfaces 51 (see FIG. 5). These vertical surfaces 51 on the carrier 45 are slidably received by the parallel vertical surfaces 52 formed on the arms 53 on the lower bifurcated end of the actuator 28. These arms 53 straddle the carrier 45 and straddle the ball member 41, the parallel vertical surfaces 52 slidably receiving the parallel vertical surfaces 54 provided on the ball member 41.

Each of the actuator arms 53 is provided with a laterally opening slot 55 having a top surface 56 and a bottom surface 57. The ball member 42 is provided with coaxial offset laterally projecting pins 58 each of which is received in one of the slots 55, respectively. The pins 58 are "offset" in the sense that they are displaced from the position of a true diameter of the ball and are parallel to such a diameter. The central passage 59 in the ball 42 is cylindrical and is substantially the same size as the cylindrical opening 61 in the carrier 45, the cylindrical opening 62 in the lower seat member 63 and the cylindrical opening 64 in the housing end piece 65.

The lower seat member 63 is mounted within the housing 15 and is resiliently urged in an upward direction toward the ball member 41 by means of coil compression springs 67 mounted in pockets 68 on the end piece 65. The springs 67 supply sufficient force to provide good sealing action between the cylindrical surface 42 of the ball member 41 and the annular seats 43 and 44. When the ball member 41 is in the open position shown in FIGS. 1b, 3 and 5, the central passage 59 is axially aligned with the bores 61 and 62 and with the longitudinal axis of the housing 15. Upward flow of fluid from the well through the passage 59 is thus unobstructed. When the ball member 41 is in the closed position, as shown in FIGS. 2 and 4, the passage 59 extends transversely of the axis of the housing 15 and the annular seats 43 and 44 seal against the cylindrical surface 42, shutting off flow.

The width of the arm slots 55 is substantially greater than the diameter of the ball pins 58. Accordingly, when the ball member 41 is to be moved from the closed position shown in FIGS. 2 and 4 to the open position shown in FIG. 3, the first part of the downward movement of the actuator 28 does not cause any turning movement of the ball member 41. This first part of the movement serves to move the external shoulder 37 on the actuator 28 downward away from the seal ring 38 so that well fluid outside the housing 15 may pass through the housing ports 71, through the annular space 72, through the clearance space between the valve parts 37 and 38, and into the interior of the actuator 28 above the ball member 41 through actuator ports 73. This action serves to equalize the pressure above and below the ball member 41 so that it may readily be rotated 90 degrees to open position. This rotation occurs when the surfaces 56 of the slot 55 contact the ball pins 58 and move them from the closed position shown in FIG. 4 to the open position shown in FIG. 3. The bypass through the ports 71 and 73 remains open so long as the rotary ball member 41 is in open position.

When it is desired to shut in the well to prevent flow therefrom, the pressure in the hydraulic line 23 controlled from the surface is reduced, so that the pressure in the annular chamber 26 is reduced. The coil spring 32 then moves the actuator 28 in an upward direction from the position shown in FIG. 3 to the position shown in FIG. 4. The ball member 41 turns easily because the pressure is equalized across the ball member so long as the clearance exists between the valve parts 37 and 38. When these parts close, further upward movement of the actuator 28 is prevented.

Figure 6:
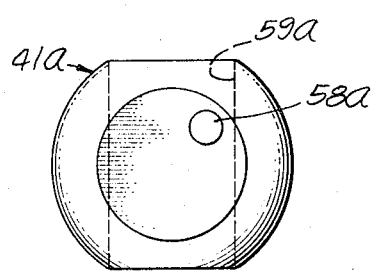
FIG. 6 is a view of the ball member in a position for use in a valve assembly which is normally open instead of normally closed.
Figure 7:
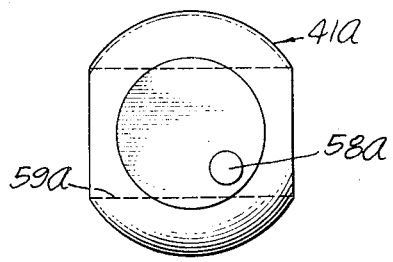
FIG. 7 is a view of the same ball member rotated 90° to closed position.

If it should be desired to use a ball valve member which is normally opened by the spring and closed by hydraulic pressure, the same ball member may be employed but it is installed in an inverted position. Thus, as shown in FIG. 6, the ball member 41a is the same as ball member 41 except that it has been turned upside down. The integral pins 58a lie above the mid-plane of the ball member when the axial passage 59a is in vertical position. When the ball 41a is rotated 90° in a clockwise direction from the position shown in FIG. 6, the pins 58a occupy the position shown in FIG. 7.

Having fully described my invention, it is to be understood that I am not to be limited to the details herein set forth but that my invention is of the full scope of the appended claims.

I claim:

1. In a rotary ball valve assembly for a well, the combination of: a tubular housing having an internal downward facing shoulder, a carrier having an upper tubular portion and having lower portions extending laterally to engage under such shoulder, said lower portions having a downward facing seat thereon, an upward facing annular seat mounted in said housing, a ball member in said housing having a spherical surface engaging both of said seats and having an axial passage therethrough, means for turning said ball member between an open position in which said axial passage is aligned with respect to said seats and a closed position in which said passage is misaligned with respect to said seats, said ball member having coaxial offset laterally projecting pins, said turning means including a tubular actuator mounted for axial movement within said housing and having a bifurcated end portion comprising a pair of arms straddling said ball member and engaging said pins, means forming a sliding seal between said tubular portion of said carrier and an inner portion of said actuator, said laterally projecting portions of said carrier extending between said arms, whereby axial movement of said actuator relative to the housing is effective to turn the ball member between open and closed positions.

2. The combination set forth in claim 1 in which each of said arms has a laterally opening slot for reception of one of said pins, respectively.

3. In a rotary ball valve assembly for a well, the combination of: a well conduit including a tubular housing having an internal downward facing shoulder, a carrier having an upper tubular portion and having a lower flange portion extending laterally to engage under such shoulder, said lower flange portion having a downward facing annular seat thereon, an upward facing annular seat mounted in said housing, a ball member interposed between said seats and having a spherical surface engaging both of said seats and having an axial passage therethrough, means for turning said ball member between an open position in which said axial passage is aligned with respect to said seats and a closed position in which said passage is misaligned with respect to said seats, said ball member and said lower flange portion having laterally spaced parallel vertical surfaces, coaxial offset pins projecting laterally from the parallel vertical surfaces on the ball member, said turning means including a tubular actuator mounted for axial movement within said housing and having a bifurcated end portion comprising a pair of arms straddling said parallel surfaces on said ball member and said lower flange portion, said arms engaging said pins, means forming a sliding seal between said tubular portion of said carrier and an inner portion of said actuator, whereby axial movement of said actuator relative to the housing is effective to turn the ball member between open and closed positions.

4. In a rotary ball valve assembly for a well, the combination of: a well conduit including a tubular housing having an internal downward facing shoulder, a carrier within the housing having a flange portion extending laterally to engage under such shoulder, said flange portion having a downward facing seat thereon, an upward facing seat mounted in said housing, a ball member interposed between said seats and having a spherical surface engaging both of said seats and having an axial passage therethrough, said ball member having coaxial offset laterally projecting pins, means for turning said ball member between an open position in which said axial passage is aligned with respect to said seats and a closed position in which said passage is misaligned with respect to said seats, said means including a tubular actuator mounted for axial movement within said housing and having a bifurcated end portion comprising a pair of arms straddling said ball member and engaging said pins, said flange portion of said carrier extending between said arms, whereby axial movement of said actuator relative to the housing is effective to turn the ball member between open and closed positions.

5. The combination set forth in claim 4 in which said upward facing seat is spring-loaded into contact with said ball member.

6. The combination set forth in claim 4 in which housing ports are provided in the tubular housing and actuator ports are provided in the tubular actuator, said housing and actuator having cooperating parts forming a bypass valve which opens upon downward movement of the actuator to permit flow from the interior of the actuator through the actuator ports and the housing ports.

7. The combination set forth in claim 4 in which a coil spring encircling a portion of the actuator acts to move the actuator in a direction to close the valve and wherein an expansible hydraulic chamber encircling the actuator acts to move the actuator in a direction to open the valve.

8. In a rotary ball valve assembly for a well, the combination of: a well conduit including a tubular housing having an internal downward facing shoulder, a carrier within the housing having a flange portion extending laterally to engage under such shoulder, said flange portion having a downward facing seat thereon, an upward facing seat mounted in said housing, a ball member interposed between said seats and having a spherical surface engaging both of said seats and having an axial passage therethrough, means for turning said ball member between an open position in which said axial passage is aligned with respect to said seats and a closed position in which said passage is misaligned with respect to said seats, said means including a tubular actuator mounted for axial movement within said housing and having a bifurcated end portion comprising a pair of arms straddling said ball member, said flange portion of said carrier extending between said arms, whereby axial movement of said actuator relative to the housing is effective to turn the ball member between open and closed positions, the housing and the actuator each having lateral ports in a wall thereof, respectively, the housing and actuator also having cooperating parts forming a bypass valve which opens upon downward movement of the actuator to permit flow from outside the housing through the housing ports and the actuator ports into the interior of the actuator.

9. In a rotary ball valve assembly for a well, the combination of: a well conduit including a tubular housing having an internal downward facing shoulder, the housing having lateral ports in a wall thereof above said shoulder, a carrier within the housing having a lower flange portion extending laterally to engage under such shoulder, said lower flange portion having a downward facing seat thereon, an upward facing seat mounted in said housing, a ball member interposed between said seats and having a spherical surface engaging both of said seats and having an axial passage therethrough, said ball member having coaxial offset laterally projecting pins, means for turning said ball member between an open position in which said axial passage is aligned with respect to said seats and a closed position in which said passage is misaligned with respect to said seats, said means including a tubular actuator mounted for axial movement within said housing and having a bifurcated end portion comprising a pair of arms straddling said ball member and engaging said pins, each arm having a lost-motion connection to its respective pin, the actuator having lateral ports in a wall thereof, said housing and actuator having cooperating parts forming a bypass valve which opens upon downward movement of the actuator to permit flow from outside the housing through the housing ports and the actuator ports into the interior of the actuator, such movement of said actuator being effective to turn the ball member from closed to open position.

* * * * *